April 8, 1930.  L. LARSON ET AL  1,753,992
SCRAPER FOR VEHICLE TIRES
Filed Feb. 13, 1928
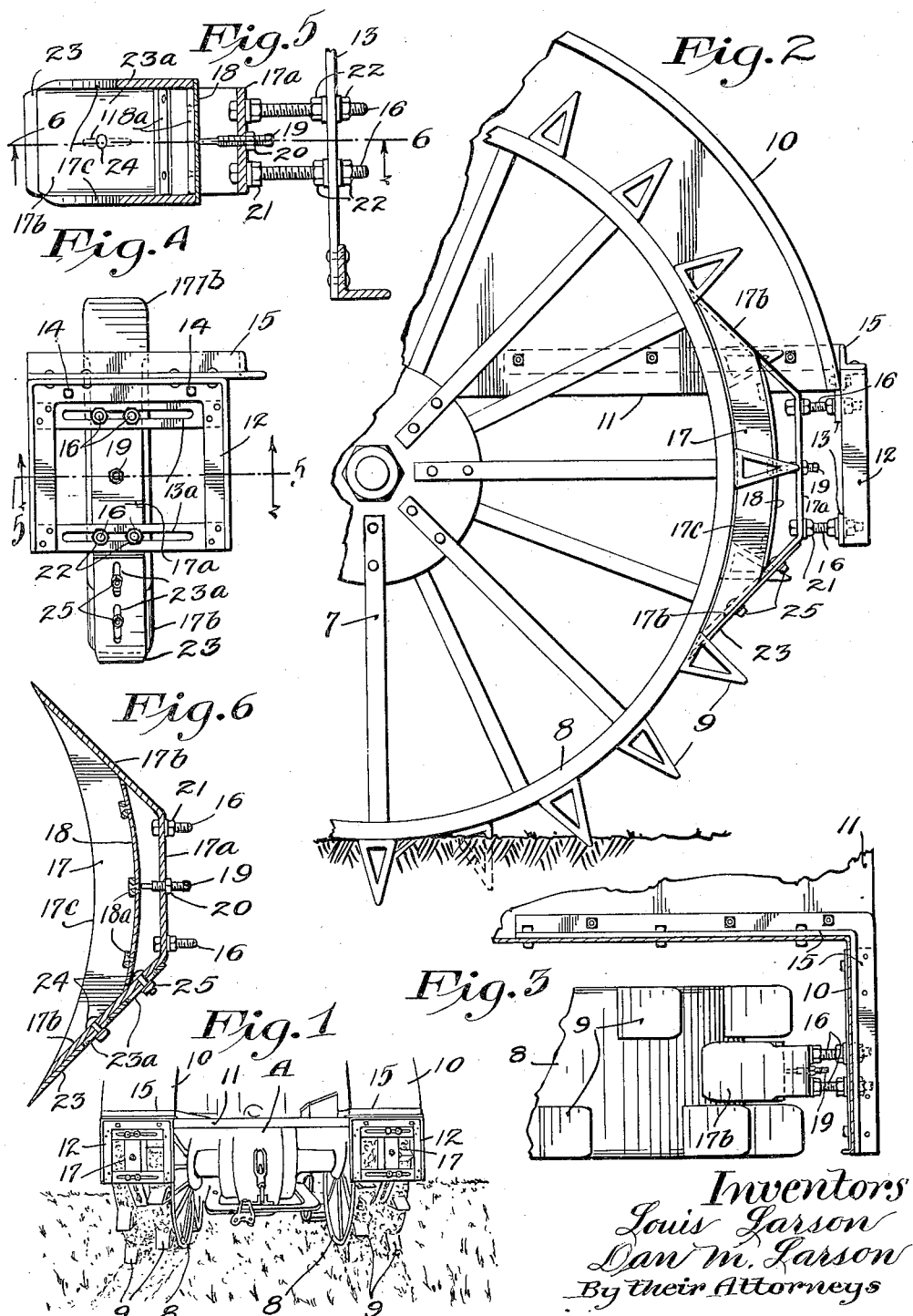
Inventors
Louis Larson
Dan M. Larson
By their Attorneys
Williamson Rey & Williamson Patented Apr. 8, 1930

1,753,992

UNITED STATES PATENT OFFICE

LOUIS LARSON AND DANIEL M. LARSON, OF HANNAFORD, NORTH DAKOTA

SCRAPER FOR VEHICLE TIRES

Application filed February 13, 1928. Serial No. 253,987.

This invention relates to devices for scraping dirt, mud and snow from the tires of vehicle wheels, and it relates particularly to scrapers for the tires of bull wheels on tractors. Ground engaging lugs are now provided on the tires of the bull wheels of many tractors. By means of these lugs, good traction is obtained between the ground and the bull wheels of the tractor. The lugs are driven down into the ground by the weight of the tractor and, accordingly, the traction obtained depends very largely on the clear length of these lugs. It is found when tractors, having their bull wheels provided with such lugs, are used in moist ground, or in clay ground, or in ground covered with snow, that the outer surface of the tires of the wheels become clogged with packed dirt, clay or snow, thereby shortening the active length of the traction lugs. When the tires become so clogged, good traction cannot be obtained and it is found that the tractors cannot pull loads prescribed by the manufacturers. It is also found when the tires are thus clogged with dirt, that the bull wheels will often slip, thereby packing down the ground over which the wheels pass and leaving troughs and ditches therein, thereby rendering the ground unfit for agriculture.

It is the object of this invention to provide a novel scraper for the tires of vehicles which is adjustable laterally of the tires of the vehicle, is adjustable radially to and from the tires of the vehicle and is adjustable along a line tangential to the tire of the vehicle, and which will scrape mud, dirt and snow from the tire.

It is a further object to provide such a scraper which is adapted to be mounted above the ground engaging surface of the tire of a tractor bull wheel having laterally spaced rows of ground engaging lugs thereon, the scraper being mounted to oppose the tire and to extend between the rows of lugs to scrape dirt from the tire during rotation thereof.

These and other objects and advantages of the invention will more fully appear from the following description made in connection with the accompanying drawings, wherein like reference characters refer to the same or similar parts through the various views and, in which, Fig. 1 is a view in rear elevation of a tractor, having mud scrapers of the present invention applied thereto;

Fig. 2 is a view in side elevation on an enlarged scale of the tractor illustrated in Fig. 1, and showing one of the mud scrapers in side elevation;

Fig. 3 is a vertical section through the mud guard of the tractor and illustrating the device of the invention in plan view, as applied to a tractor;

Fig. 4 is a view in rear elevation of the device of the invention;

Fig. 5 is a horizontal section taken on the line 5—5 of Fig. 4, as is indicated by the arrows, and Fig. 6 is a vertical section taken on the line 6—6 of Fig. 5, as is indicated by the arrows.

Referring to the drawings, portions of a tractor A are illustrated, which include the bull wheels 7 having tires 8 and a pair of laterally spaced rows of circumferentially spaced ground engaging lugs 9 on the outer surface thereof. Mud guards 10 for the bull wheels are also shown and the said mud guards are connected to the main frame 11 of the tractor. In accordance with the present invention, a U-shaped frame 12 formed from channel iron is provided, the central portion of the U extending upwardly and the arms of the U extending downwardly. Two bars 13 are provided, one of which extends between the lower ends of the arms of the U-shaped frame and the other of which extends between the arms of the frame immediately below the central portion of the U. The two bars 13 extend in a substantially horizontal plane in spaced relation and each bar has a longitudinal slot 13ª therein, which slot extends between the two arms of the frame. The frame 12 is preferably secured as by bolts 14 extending through the base portion of the U of the frame 12 to the rear lower end of a mud guard 10 of the tractor. Preferably a brace bar, such as the angle bar 15, has an arm secured to the outer flange of the base portion of the U of the frame, and has another arm secured to the side of the mud guard 10 and also preferably to the main frame 11 of the tractor.

Extending through each of the slots 13ª, on the bars 13, are a pair of spaced bolts 16, which are mounted in bolt openings projecting through the rear portion of a shoe 17. The shoe 17 comprises a straight rear bar 17ª, through which the bolts 16 extend, arms 17ᵇ preferably formed integral with the bar 17ª and projecting from the ends thereof at obtuse angles thereto, and arcuate side plates 17ᶜ secured to, and extending between the outer ends of the arms 17ᵇ. A removable spring plate 18 bears against the rear edges of the arcuate side plates 17ᶜ and closes the rear side of a casing formed by the outer ends of arms 17ᵇ, the arcuate side plates 17ᶜ and the spring plate 18. The spring plate 18 is provided with several short bars 18ª at its forward side, which are of such length as to extend between the inner sides of the arcuate plates 17ᶜ, and the sides of the spring plate are held against the rear edges of the arcuate plate 17ᶜ, by means of a bolt 19 threaded through the central portion of the bar 17ª and held in place thereon by a lock nut 20. It will be seen that the plate 18 may be removed to open the rear side of the casing by unloosening the lock nut 20 and bolt 19 and sliding the plate 18 out of its normal position. The bolts 16 have heads bearing against the forward side of the bar 17ª and are secured to the bar by means of nuts 21, threaded onto the bolts, the nuts bearing against washers interposed between the rear side of the bar 17ª and the nuts. The rear ends of the bolts 16 project through the slots 13ª of bars 13, and are secured to the bars by means of nuts 22 disposed at either side of the bars 13, washers being provided between the nuts and the sides of the bars 13. It will be readily seen that adjustment of the shoe 17 to and from the frame 12 can be made by unloosening the nuts 22 and shortening or lengthening the portions of the bolts 16 between the bars 13 and the bars 17ª of the shoe, whereupon the nuts 22 may be again tightened to securely hold shoe 17 in position.

The arcuate curvature of the side plates 17ᶜ of the shoe is similar to the arcuate curvature of the tire 8, and the arms 17ᵇ are so disposed, relative to the tire, that they extend in planes substantially tangential to the tire. A scraper blade 23 bears against the lower side of the lower arm 17ᵇ and has slots 23ª therein through which bolts 24, secured to the lower arm 17ᵇ, extend. The slots 23ª are so formed that the blade 23 may be slid to or from the tire of the bull wheel in a plane substantially tangential to the tire and the blade may be secured in any desired adjusted position by nuts 25 threaded on to the lower ends of the bolts 24. Preferably the blade 23, as well as the outer ends of the arms 17ᵇ, are pointed as shown, throughout the main portions, but are rounded slightly adjacent their sides. The blade 23 is made of slightly narrower width than the width of the arm 17ᵇ.

In use on a tractor having bull wheels, the tires of which have spaced sets of ground engaging lugs thereon, the frame 12 and bar 15 will be mounted as described. The shoe 17 may then be adjusted laterally in the slots 13ª on bars 13 until the shoe and blade 23 are disposed opposite the tire 8 between the rows of lugs 9 thereon. The shoe will face the tire of the bull wheel and may be adjusted radially to or from the tire by adjustment of the nuts 22. Preferably the shoe will be so disposed that it projects quite close to the tire 12. The blade 23 may then be adjusted in a plane tangential to the tire 8 to and from the tire by sliding the same relative to the bolts 24. The blade 23 will, accordingly, be capable of lateral, radial and tangential adjustment to and from the tire of the bull wheel. As the tractor is driven, the blade 23 will be disposed at the rear of the bull wheel and adjacent thereto. As packed dirt is picked up by the tire of the wheel, the blade 23 will oppose the same and scrape it from the tire between the rows of lugs thereon. As the dirt accumulating on the tire of the wheel usually forms in cakes and will adhere together quite closely in packed condition, a large part of the layer of dirt formed between the lugs of the wheel will also fall off as the layer of dirt between the rows of lugs on the wheel falls off. Accordingly, practically the entire outer surface of the tire of the wheel will be cleaned from accumulations of dirt when the tractor is in use. If dirt should accumulate within the casing formed by the arcuate plate 17, arms 17ᵇ and removable plate 18, the plate 18 can be readily removed, whereupon dirt can be cleaned from the casing.

In addition to its use as a scraper for mud, snow and the like, from the tire of a vehicle wheel, the present device may be used for determining whether the wheel is properly alined or not on its axle. Although the device is illustrated as being used in connection with a tractor having spaced rows of lugs on its bull wheel, it will be seen that the device can equally as well be used in connection with plane surfaced tires, or tires having only one row of lugs thereon. Due to the fact that bolts 21 are capable of lateral adjustment respective to the bars 13, the device can be used on either wheel of the tractor without change in the form thereof, it being only necessary to make the securing bar 15, or similar holding means, in rights and lefts for different wheels.

The device has been amply demonstrated in actual practice and has been found to be successful and efficient in operation for the purposes disclosed.

It will, of course, be understood that various changes may be made in the form, details, arrangement and proportions of the various parts without departing from the scope of the present invention which, generally stated, consists in the matter shown and described, and set forth in the appended claims.

What is claimed is:

1. The combination with a tire on the wheel of a vehicle, of an arcuate casing mounted on the vehicle body above the ground engaging surface of the tire to oppose the tire, said casing having straight upper and lower end walls extending substantially tangentially respective to the tire in opposite directions and crosswise of the tire, said end walls terminating in sharpened portions adjacent the tire.

2. The combination with a tire on the wheel of a vehicle, of an arcuate shoe mounted on the vehicle body above the ground engaging surface of the tire to oppose the tire, said shoe having upper and lower end walls extending substantially tangentially respective to the tire in opposite directions, said end walls being in close proximity to the tire, and a removable plate closing the rear side of said shoe and adapted to be removed to permit the shoe to be cleaned out.

3. The combination with a tire on the wheel of a vehicle, of an arcuate shoe mounted on the vehicle body above the ground engaging surface of the tire to oppose the tire, said shoe having upper and lower end walls extending substantially tangentially respective to the tire in opposite directions, said end walls being in close proximity to the tire and a scraper blade secured to one of said end walls and adjustable tangentially thereon to and from the tire.

In testimony whereof we affix our signatures.

LOUIS LARSON.
DANIEL M. LARSON.